(12) United States Patent
Thenander et al.

(10) Patent No.: US 11,987,155 B2
(45) Date of Patent: May 21, 2024

(54) CHILD SAFETY SEAT ASSEMBLY

(71) Applicant: Axkid AB, Gothenburg (SE)

(72) Inventors: Robert Thenander, Nygård (SE);
Daniel Lundgren, Mölndal (SE);
David Röstedal, Jönköping (SE)

(73) Assignee: AXKID AB, Gothenburg (SE)

( * ) Notice: Subject to any disclaimer, the term of this patent is extended or adjusted under 35 U.S.C. 154(b) by 137 days.

(21) Appl. No.: 17/425,372

(22) PCT Filed: Jan. 30, 2020

(86) PCT No.: PCT/EP2020/052353
§ 371 (c)(1),
(2) Date: Jul. 23, 2021

(87) PCT Pub. No.: WO2020/157234
PCT Pub. Date: Aug. 6, 2020

(65) Prior Publication Data
US 2022/0097577 A1    Mar. 31, 2022

(30) Foreign Application Priority Data

Jan. 30, 2019  (EP) .................................... 19154530

(51) Int. Cl.
*B60N 2/28*    (2006.01)
(52) U.S. Cl.
CPC ......... *B60N 2/2887* (2013.01); *B60N 2/2821* (2013.01); *B60N 2/2863* (2013.01); *B60N 2/2875* (2013.01)
(58) Field of Classification Search
CPC .. B60N 2/2887; B60N 2/2821; B60N 2/2863; B60N 2/2875
See application file for complete search history.

(56) References Cited

U.S. PATENT DOCUMENTS

| 5,286,085 A | * | 2/1994 | Minami | ............... | B60N 2/2821 |
| | | | | | 297/216.16 |
| 5,810,436 A | * | 9/1998 | Surot | ................... | B60N 2/2821 |
| | | | | | 297/256.13 |

(Continued)

FOREIGN PATENT DOCUMENTS

| CN | 201677768 U | 12/2010 |
| DE | 102006011520 A1 | 9/2007 |

(Continued)

OTHER PUBLICATIONS

International Search Report (PCT/ISA/210) and Written Opinion (PCT/ISA/237) dated Apr. 28, 2020, by the European Patent Office as the International Searching Authority for International Application No. PCT/EP2020/052353.

*Primary Examiner* — Philip F Gabler
(74) *Attorney, Agent, or Firm* — BUCHANAN, INGERSOLL & ROONEY PC

(57) ABSTRACT

A child safety seat assembly for use in a rear facing position. The child safety seat assembly includes: a child safety seat, and a base portion, to be placed on a vehicle seat and for holding the child safety seat. The base portion includes at least one rail, a pair of ISOFIX latches, connected to the at least one rail and for connecting the base portion to the vehicle seat, and a sledge connected to the at least one rail and for holding the child safety seat. The sledge is, with the child safety seat mounted thereon, movable along the at least one rail such that the position of the child safety seat is adjustable when the child safety seat assembly is connected to the vehicle seat.

13 Claims, 6 Drawing Sheets

(56) References Cited

U.S. PATENT DOCUMENTS

| | | | | |
|---|---|---|---|---|
| 7,488,034 | B2* | 2/2009 | Ohren | B60N 2/2887 |
| | | | | 297/256.16 |
| 10,442,325 | B2* | 10/2019 | Wang | B60N 2/4228 |
| 10,640,020 | B2* | 5/2020 | Jung | B60N 2/2875 |
| 2016/0200225 | A1* | 7/2016 | Van Der Veer | B60N 2/2863 |
| | | | | 297/256.16 |
| 2019/0135142 | A1 | 5/2019 | Jung et al. | |

FOREIGN PATENT DOCUMENTS

| | | |
|---|---|---|
| DE | 202013103509 U1 | 11/2013 |
| EP | 1369294 A1 | 10/2003 |
| EP | 2551150 A2 | 1/2013 |
| EP | 2857258 A1 | 8/2015 |
| EP | 3689671 A1 | 8/2020 |
| FR | 2763292 A1 | 5/1997 |
| GB | 2425463 A | 11/2006 |
| WO | 2005108155 A2 | 11/2005 |
| WO | 2013040692 A1 | 3/2013 |
| WO | 2017/179745 A1 | 10/2017 |
| WO | 2018178017 A1 | 10/2018 |

* cited by examiner

CHILD SAFETY SEAT ASSEMBLY

TECHNICAL FIELD OF THE INVENTION

The present inventive concept relates to a child safety seat assembly, and more particularly, a child safety seat assembly for supporting a child safety seat which is placed in a counter direction of travel and which position is adjustable after the child safety seat assembly is inserted in the vehicle.

BACKGROUND OF THE INVENTION

A child should preferably be placed in a rear facing position in the vehicle in order to reduce the force acting on the child's neck in case of an accident. The rear facing position provides better protection in case of an accident. Often the child's parents place the child in a forward position long before recommended. Reason for that could be that the space for the legs of the child is limited whereupon the child starts to whine during travelling. Other reasons could be that the child safety seat may be difficult to insert in the vehicle or that the adjustment of the position of the child safety seat is difficult to handle. Further reasons why the child seat is put in a forward position could be that children of different ages or sizes may use the same child seat at different occasions, whereupon the position of the child safety must be adjusted in between each child that shall use the child safety seat. The present inventive concept seeks to provide a child safety seat assembly which is less complex to use and is easier to adjust to the size of the child than other prior art solutions.

SUMMARY OF THE INVENTION

An object of the inventive concept is to mitigate the above problems, and to provide a child safety seat assembly which, at least to some extent, is less complex than prior art solutions. This, and other objects will become apparent in the following, are accomplished by means of a child safety seat assembly comprising an adjustable child safety seat defined in the accompanying claims.

The present inventive concept is based on the insight that the position of a child safety seat is adjustable after the child safety seat arrangement is inserted in the vehicle. In particular, it has been realized that a two-part arrangement may be provided, in which a first part (such as rails) may be fixed to the vehicle seat, while allowing a second part (such as the child safety seat and associated components) to be displaceable relative to the first part.

According to at least a first aspect of the present inventive concept, a child safety seat assembly for use in a rear facing position is provided. The child safety seat assembly comprises:
- a child safety seat, and a base portion, to be placed on a vehicle seat and for holding said child safety seat, wherein said base portion comprises
- at least one rail,
- a pair of ISOFIX latches, connected to said at least one rail and for connecting said base portion to the vehicle seat, and
- a sledge connected to said at least one rail and for holding said child safety seat, wherein said sledge being, with said child safety seat mounted thereon, movable along said at least one rail such that the position of said child safety seat is adjustable when said child safety seat assembly is connected to the vehicle seat.

Hereby, the position of the child safety seat may be adjusted when the child safety seat assembly is secured in the vehicle. Hence, the user does not need to remove the child safety seat assembly in order to adjust the position of the child safety seat. It could be an advantage to adjust the child safety seat when the child safety seat assembly is inserted in the vehicle, because it may be easier for the user to judge what position is appropriate for the child safety seat, e.g. with regards to space of the child's legs or the space the driver needs to have good view when driving. It should be understood that the space that the child safety seat occupies could be disturbing for the driver. Having a child safety seat that is easy to adjust for the driver may thus save annoying occupying area of the child safety seat assembly which prevents proper view of the driver. Furthermore, when the vehicle is to be driven by various drivers, each driver may want to adjust the child safety seat assembly in order to have as much view as possible. Therefore, it is advantageous to have a child safety seat assembly which is adjustable for the driver without having the child safety seat assembly removed from the vehicle seat. Furthermore, it might be possible that the driver fastens the child safety seat assembly in the vehicle before the child sits down on the child safety seat, whereby the child does not have enough space for his/her legs and the position of the child safety seat must be adjusted afterwards. Hereby, the child safety seat may be adjusted without loosening the child safety seat assembly from the vehicle seat.

Furthermore, the child safety seat assembly may be used for children of different sizes and adjusted for each child without having the child safety seat assembly removed for adjustment.

It could be an advantage to adjust the position of the child safety seat such that the child safety seat is in a forward position seen from the front side when the child safety seat assembly is to be inserted into the vehicle. Hereby, the child safety seat assembly may occupy less volume. When the child safety seat assembly is installed in the vehicle the child safety seat may then be adjusted to the preferred position with regards to the appropriate circumstance.

According to at least one embodiment the base portion comprises at least one rod or a flat base which the sledge is able to slide on.

According to at least one example embodiment, base portion is a chassis.

According to at least one example embodiment, the base portion further comprises an intermediate portion connected to the at least one rail and to which the pair of ISOFIX latches are connected.

The term rear facing position should herein an henceforth be understood as a backward facing position seen from the driver's seat.

According to at least one example embodiment the child safety seat assembly further comprising adjusting means, arranged on said child safety seat, for adjusting the longitudinal position of said child safety seat along said at least one rail. In this disclosure the terms longitudinal position and longitudinal direction refer to a position/direction which is parallel with the lengthwise extension of the rails.

Hereby, the position of the sledge which the child safety seat is connected to may be adjusted by the adjusting means arranged on the child safety seat. Furthermore, having the adjusting means arranged on the child safety seat may facilitate the adjusting of child safety seat since the child safety seat is mountable on top of the sledge. The adjusting means may thus be easy to access. An adjusting means provided on the child safety seat could be easy accessible for the user, e.g. when the child safety assembly is inserted in the vehicle.

In one example embodiment the adjusting means are arranged on the sledge. Hereby, the position of sledge holding the child safety seat may be adjusted along the rail by changing the position of the sledge regardless if the child safety seat is connected to the sledge or not.

According to at least one example embodiment, each rail comprises a set of receiving openings distributed in the longitudinal direction of the rail and said sledge comprises at least one pin adapted to connect to any opening of said set of receiving openings, such that the position of said sledge relative said base portion is secured by said pin.

Hereby, the sledge adapted to hold the child safety seat is prevented from movement with regards to the base portion. Consequently, a child safety seat connected to the sledge is prevented from movement with regards to the base portion. It should be understood that the pin is adapted to releasingly fix the position of the sledge to the base portion. Hereby, the space for the child's legs is adjustable.

It should be understood that the receiving openings may refer to any kind of hole, aperture, opening, cavity or perforation provided on the rails.

In one example embodiment, the position of the sledge relative the base portion is secured by any kind of fastener adapted to connect two or more components to each other.

According to at least one example embodiment, said adjusting means comprise an actuator located on the back of said child safety seat, said actuator having a first state in which said sledge is prevented from sliding and a second state in which said child safety seat is movable along said base portion.

Hereby, the possibility to adjust the position of the child safety seat relative the base portion requires an activity by the user. I.e. the child safety seat is prevented from moving as long as said actuator is kept in the first state. However, by changing the actuator from the first state to the second state, the user may adjust the position of the child safety seat without having the child safety seat removed from the base portion and without disconnecting the child safety seat assembly from the vehicle.

It should be understood that the actuator may refer to a locking mechanism in general which is unsecured by manual control.

An advantage with the actuator is that the position of the child safety seat may be adjusted without aid of any tools.

According to at least one example embodiment said adjusting means comprises a handle for adjusting the position of said child safety seat and wherein said actuator is located in connection to said handle, such that maneuvering of said actuator from said first state to said second state, and positional adjustment of said child safety seat are manageable simultaneously by one hand.

Hereby, the position of the child safety seat is adjustable in that the user grabs hold of the handle and changes the actuator from the first state to the second state, meanwhile pushing or pulling the child safety seat until the desired position is reached. The adjustment of the position of the child safety seat may thus be performed by either one or two hands. When the desired position is reached the user may release the handle whereby the actuator automatically may return to the first state.

According to one example embodiment the actuator is located on said handle, such that release of said actuator and positional adjustment of said child safety seat are manageable simultaneously by one hand or two hands.

In one example embodiment, said adjusting means comprise an actuator located on any outer part of the child safety seat. Hereby, the adjustment of the child safety seat relative the base portion is manageable by maneuvering the actuator from the first state to the second state by means of an actuator provided at any location on the child safety seat.

According to at least one example embodiment said actuator is connected to at least one wire extending from said pin to said actuator, and wherein a repositioning of said actuator from said first state into said second state disconnects said pin from one of said set of receiving openings, such that the longitudinal position of said child safety seat relative said at least one rail is adjustable.

Hereby, the actuator may be adapted to deactivate the pin from the rail. E.g. the actuator may be adapted to provide the pin from retracting from the rail such that the position of the child safety seat relative the rail is adjustable.

The adjusting means may comprise a wire extending from the pin to the child safety seat. The wire is connected to actuator and manually controllable by means of the actuator. Hereby the longitudinal position of the child safety seat relative the base portion is adjustable.

According to at least one example embodiment said pin comprise a compression spring, and wherein said compression spring provides a tension to said pin such that said pin is urged to connect to one of said set of receiving openings when said pin is substantially aligned with one of said set of receiving openings.

Hereby, the compression spring secures that the sledge and the rail are automatically connected. Furthermore, once the pin is inserted in one of the receiving openings, the compression spring provides the securing of the sledge to the rail to be automatically maintained. Thus, it requires a force to compress the spring and to disconnect the pin from the receiving opening.

In one example embodiment, the pin that is connected to the wire and which is adapted to the secure the sledge to the rail is a tension pin.

According to at least one example embodiment, said sledge comprises at least one wheel adapted to run within said at least one rail such that said sledge is able to run within said at least one rail.

It should be understood that the sledge may comprise any kind of sliding means, e.g. rods etc., adapted for movement of the sledge relative the rail.

Hereby, the movement of the sledge relative the rail may be feasible with the child sitting in the child safety seat.

According to at least one example embodiment, said child safety seat is pivotally connected to said sledge at a first location such that said child safety seat is adapted to be tilted with respect to said sledge at said first location.

Hereby, the child safety seat may be tilted relative the sledge. The child using the child safety seat may thus change his/her position in the child safety seat arrangement. Furthermore, the child safety seat assembly is adapted for children at different ages. I.e. a small child may be prone to sit in a child safety seat which is more inclined than the child safety seat suitable for an older child.

According to at least one example embodiment, the child safety assembly comprises a screw connecting said child safety seat to said sledge at a second location spaced apart from said first location, and wherein operation of said screw is such that its length between said child safety seat and said sledge is changed, said child safety seat is tilted against or away from the backrest of the vehicle seat.

Hereby, the position of the child safety seat may be adjusted with regards to the sledge by means of the screw connecting the child safety seat to the sledge. The screw may be adjusted when the child safety seat assembly is connected to the vehicle. Consequently, the child safety seat may be tilted when the child safety seat assembly is inserted in the vehicle. Thereby, the child safety seat must does not need to be removed in order to change the inclination of the child safety seat.

It should be understood that the meaning of the child safety seat being able to tilt relative the sledge corresponds to the child safety seat being tiltable relative the base portion.

The tilting may be performed when the child safety seat is connected to the base portion and when the child safety assembly is anchored in the vehicle. Furthermore, the tilting of the child safety seat may be able to be performed when the child is using the child safety seat assembly, e.g. when the child is sitting in the child safety seat.

In one example embodiment, the length of the screw decides how much the child safety seat may be tilted in relation to the sledge.

In one example embodiment, the sledge is adapted to adjust the position of the child safety seat in two different ways, one way is to adjust the longitudinal position of the child safety seat relative the rail and the other way is to adjust the tilting position of the child safety seat relative the sledge such that the child safety seat may be more or less reclined. Both of the two adjustment may be possible to perform when the child safety assembly is inserted in the vehicle and when the child is sitting in the child safety seat.

According to at least one example embodiment, the child safety seat assembly further comprises a brace connected to said at least one rail and a supporting leg connected to said at least one rail such that said base portion has four anchoring points.

Hereby, the adjustment of the longitudinal position of the child safety seat relative the base portion may be feasible with the base portion connected to the vehicle by means of ISOFIX, supporting leg, and brace anchored in the vehicle. None of the anchoring points need to be removed in order to adjust the child safety seat.

According to at least one example embodiment said child safety seat is fixed to the child safety assembly, such that said child safety assembly comprises no parts intended for removal from said child safety seat assembly.

Hereby, the child safety seat may not be adapted to be exchanged to a child safety seat of another size. On the opposite, the child safety seat assembly may thus be adapted to be used for children of different ages and sizes.

DETAILED DESCRIPTION OF DRAWINGS

In the following description, the present inventive concept is described with reference to a child safety seat assembly.

DETAILED DESCRIPTION OF THE DRAWINGS

In the following description, the present inventive concept is described with reference to a child safety seat assembly comprising a base portion and a child safety seat and wherein the position of the child safety seat is adjustable when said child safety seat assembly is connected to the vehicle seat.

Figure 1:
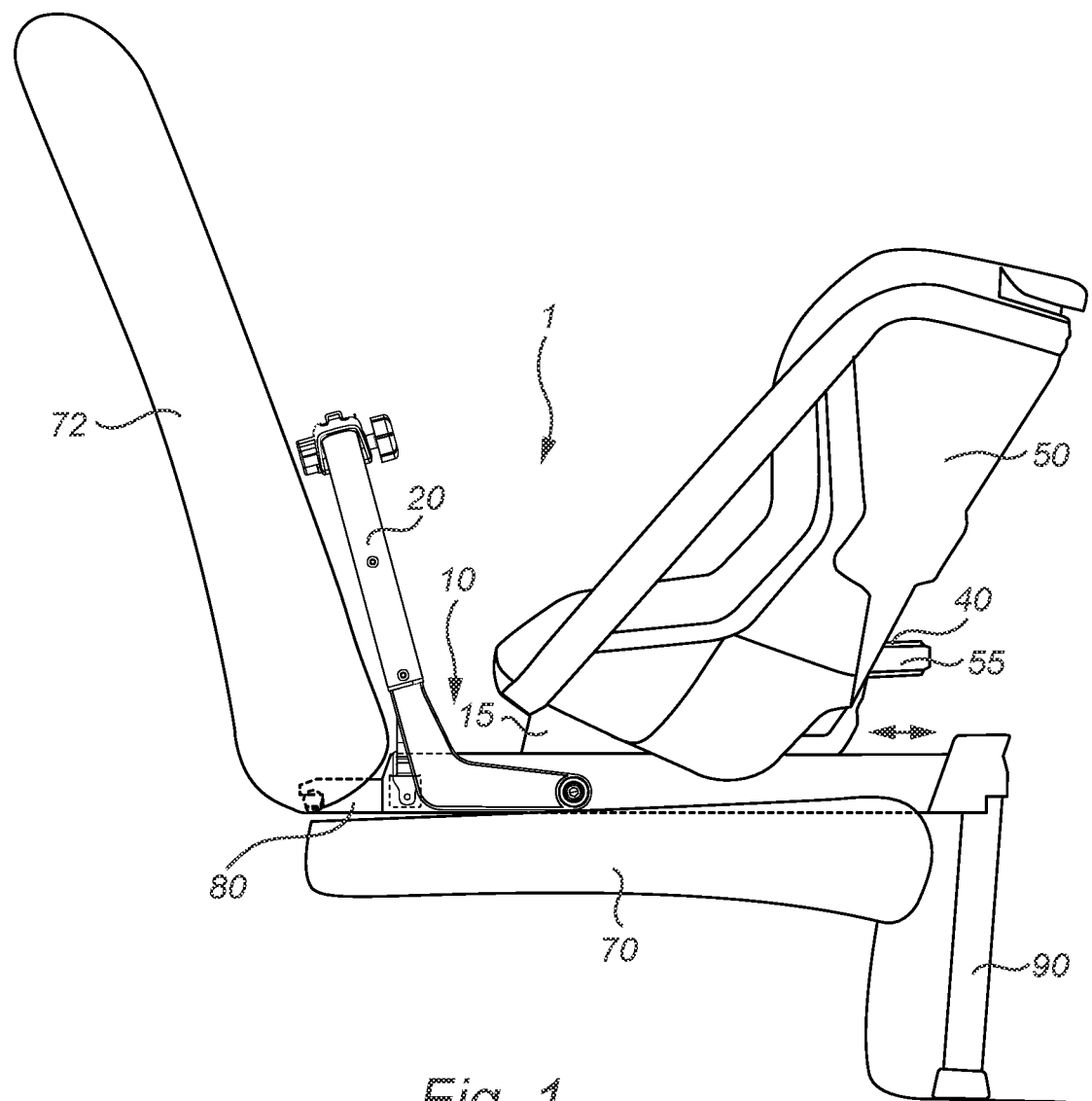
FIG. 1 illustrates, in a side view, a child safety seat assembly according to at least one example embodiment of the inventive concept.

FIG. 1 illustrates a child safety seat assembly 1 inserted in a vehicle. The child safety assembly 1 comprises a base portion 10, placed on a vehicle seat 70. The base portion 10 holds, in a rear facing position, a child safety seat 50. The base portion 10 comprises a movable sledge 15 which the child safety seat 50 is connected to.

Figure 2:
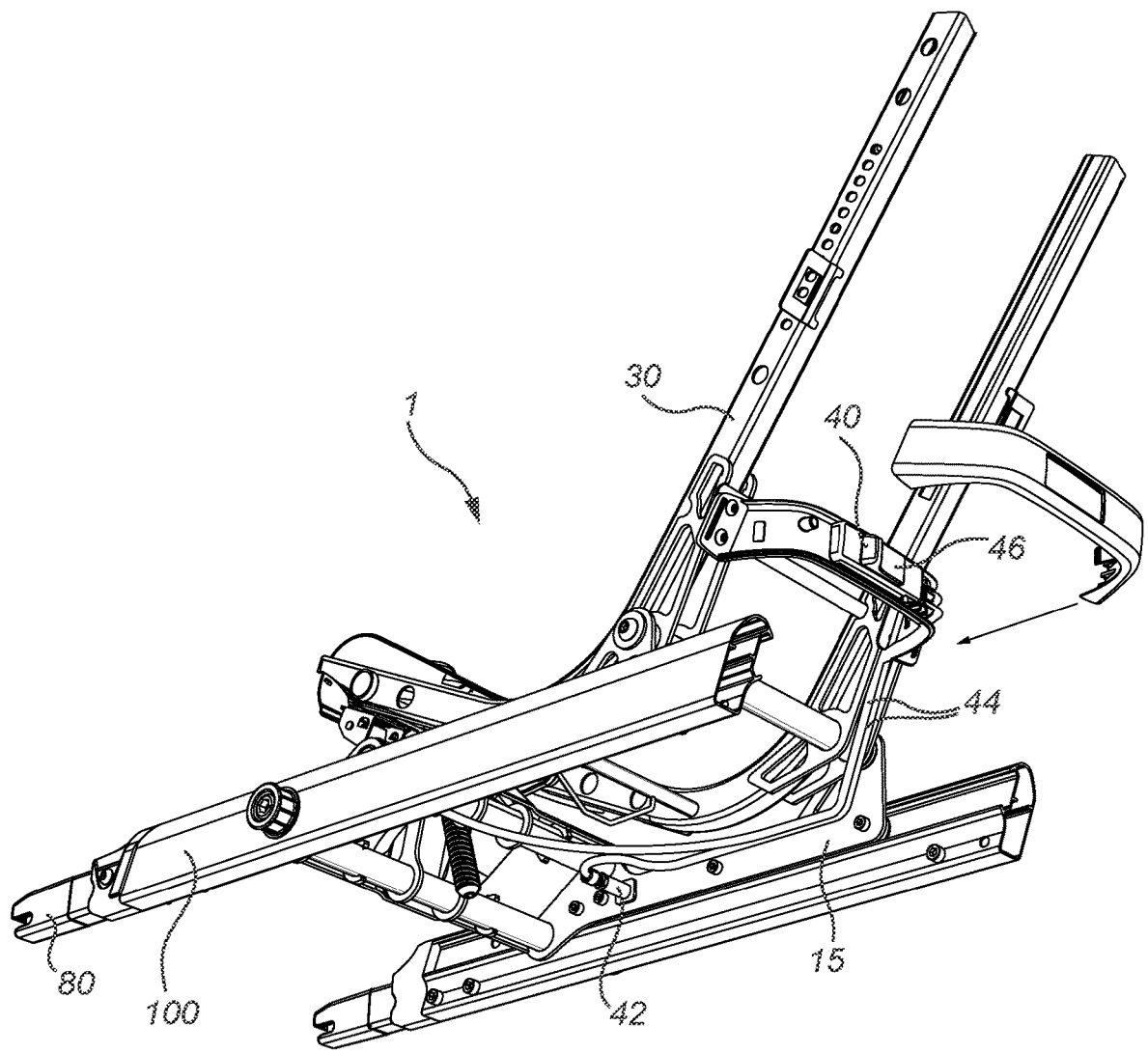
FIG. 2 illustrates, in an exploded view, parts of the child safety seat assembly according to at least one example embodiment of the inventive concept.

The base portion 10 is connected to the vehicle seat 70 by a pair of ISOFIX latches 80. (The latches 80 are connected to a pair of rails 100, as illustrated in FIG. 2.) The base portion 10, illustrated in FIG. 1, further comprises a supporting leg 90, pressed against the floor of the vehicle, and which acts as a support for the base portion 10. The child safety seat assembly 1, illustrated in FIG. 1, further comprises a brace 20, arranged to be pressed against the backrest 72 of the vehicle seat. As similar to the supporting leg 90, the brace 20 acts as a support for the base portion 10. The brace 20 is adapted to prevent the base portion 10 from tilting from the vehicle seat 70 in case of an accident.

In FIG. 1, an adjusting means 40 comprising a handle 55 is arranged on the backside of the child safety seat. The handle 55 is arranged to adjust the position of the child safety seat 50 along the base portion 10 such that the position of the child safety seat relative the backseat may be altered by means of the movable sledge 15 to which the child safety seat 50 is connected. E.g. the child safety seat 50 may be positioned close to the backrest 72 when there is no child sitting in the child safety seat assembly 1. Hereby, the child safety seat 50 may not disturb the driver's view when the child safety seat assembly is mounted on the front seat. On the other hand, the child safety seat 50 may be positioned in farther position from the backseat 72 if the child safety seat assembly 1 is to be used by a child having long legs in order to allow the child to have more space for his/her legs.

FIG. 2 illustrates, in a partly exploded view, parts of the child safety seat assembly 1 without clothing, padding, etc. for purpose of clarity. The child safety seat assembly 1, in FIG. 2 comprises a frame 30 for the child safety seat 50 illustrated in FIG. 1. The frame 30 is connected to the sledge 15. The sledge 15 is arranged to hold the frame 30 and to be movable along a pair or rails 100 positioned on the vehicle seat 70, as illustrated in FIG. 1. The ISOFIX latches 80 arranged to secure the child safety seat assembly 1 to a vehicle seat 70, as illustrated in FIG. 1, are connected to respective rail 100. The sledge 15 is secured to the rails 100 by a pin 42 located on the inner side of respective sledge 15 edge, such that the sledge 15 and the child safety seat 50 are in a fixed position and prevented from sliding along the rails 100. Each pin 42 is connected to a wire 44. The wires 44, in FIG. 2, extend from the pin 42 to the back of the child safety seat 50 where they are connected to adjusting means 40. The adjusting means comprise actuator 46 arranged on said handle 55. By operating the actuator 46 (e.g. here moving or sliding) the wire 44 pulls the pins 42 from the rails 100 such that the sledge 15 is disconnected from the rail 100. The sledge 15 and the child safety seat 50 attached to the sledge 15 is then able to be moved along the rails 100 such that the positon of the child safety seat 50 is altered. Thus, the actuator 46 can be considered to have a first state, in which the pins 42 lock the sledge 15 to the rails 100 and a second state in which the sledge 15 is disconnected. Upon returning the actuator 46 to its first state, the pins 42 will lock the sledge 15 at its new position along the rails 100.

Figure 3A:
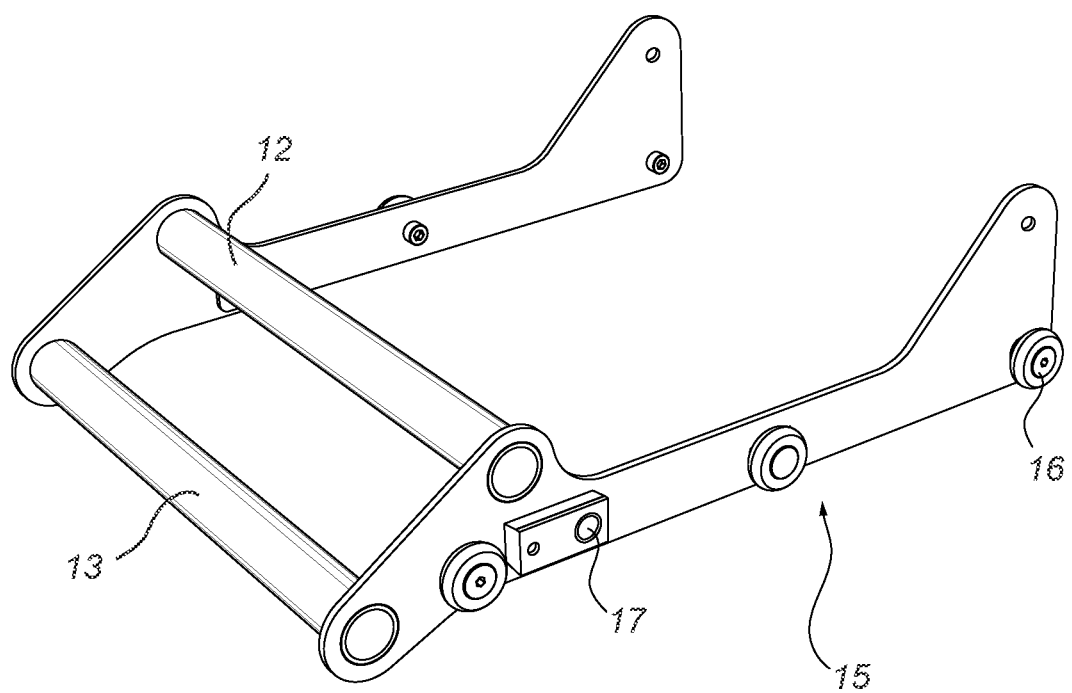
FIG. 3a illustrates a sledge according to at least one example embodiment of the inventive concept.

FIG. 3a illustrates a sledge 15. The sledge comprises three wheels 16 on each side of the sledge 15. However, other number of wheels, such as two is also conceivable. The wheels 16 are arranged to run inside a rail 15, as illustrated in FIG. 2. The sledge 15 further comprises a first receiving opening 17 arranged on each side of the sledge 15 and which a pin 42 is arranged to connect to as illustrated in FIG. 2. The sledge 15 comprises a first rod 13 and a second rod 12, extending substantially perpendicularly to the pair of rails 10 which the sledge is arranged to, as illustrated in FIG. 2.

Figure 3B:
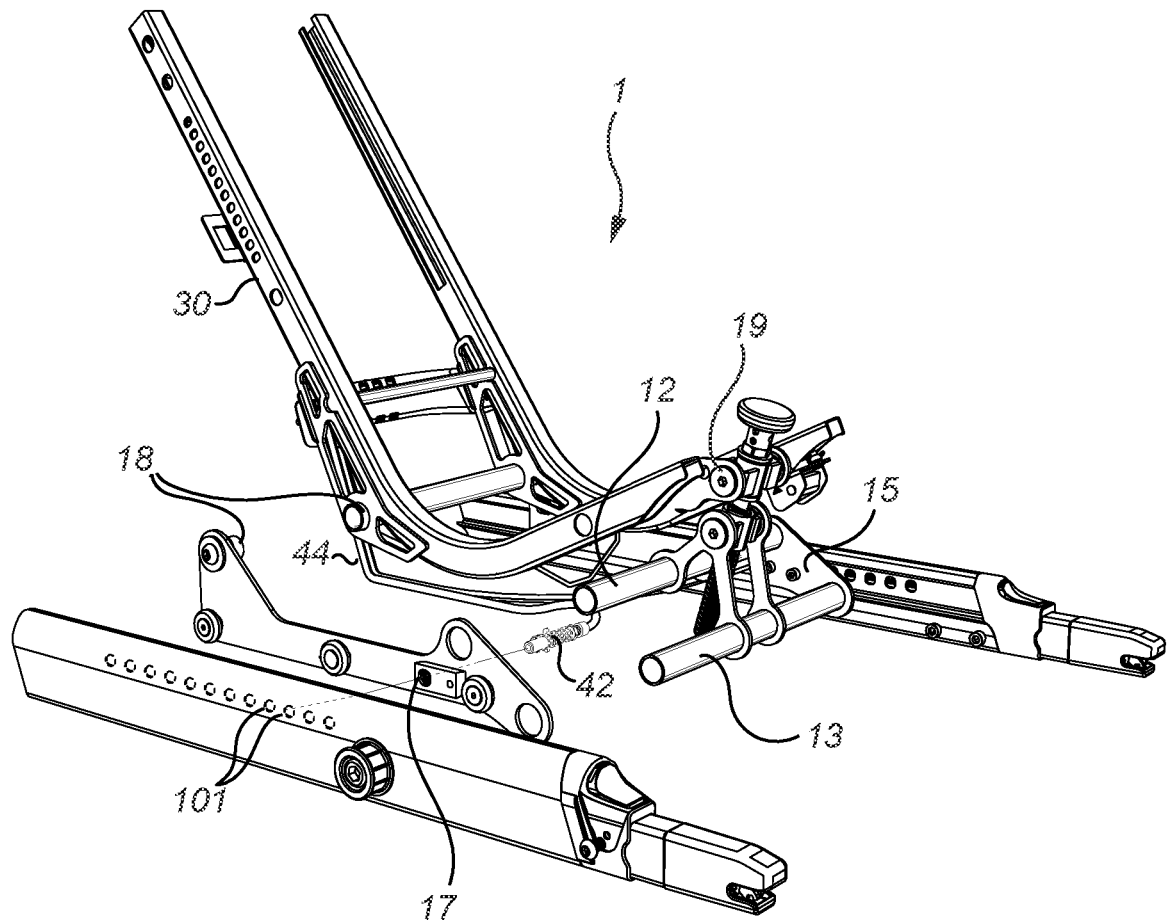
FIG. 3b illustrates, in an exploded view, parts of the child safety seat assembly according to at least one example embodiment of the inventive concept.

FIG. 3b also illustrates that the sledge 15 has a receiving opening 17 which a pin 42 is arranged to be connected to. The pin 42 is further arranged to fit into one of a set of receiving openings 101 located on each one of a pair of rails 100 adapted to rest on a vehicle seat, as illustrated in FIG. 1. The receiving openings 101 are distributed along the longitudinal direction of the rails 100. By changing which one of the set of receiving openings 101 the pin 42 is inserted in, the position of the child safety seat 50 is regulated. The pin 42 is regulated by said adjusting means 40 arranged on the child safety seat 50, as illustrated in FIG. 1 and FIG. 2, and is arranged to provide a movable child safety seat 50. FIG. 3b also illustrates how the pin 42 is connected to the wire 44 which is connected to the actuator 46 provided on the back of the child safety seat 50, as illustrated in FIG. 2.

FIG. 3b further illustrates the first rod 13 and the second rod 12, illustrated in FIG. 3a. The child safety seat 50 is pivotally connected to the sledge 15 at a first location 18.

Figure 4:
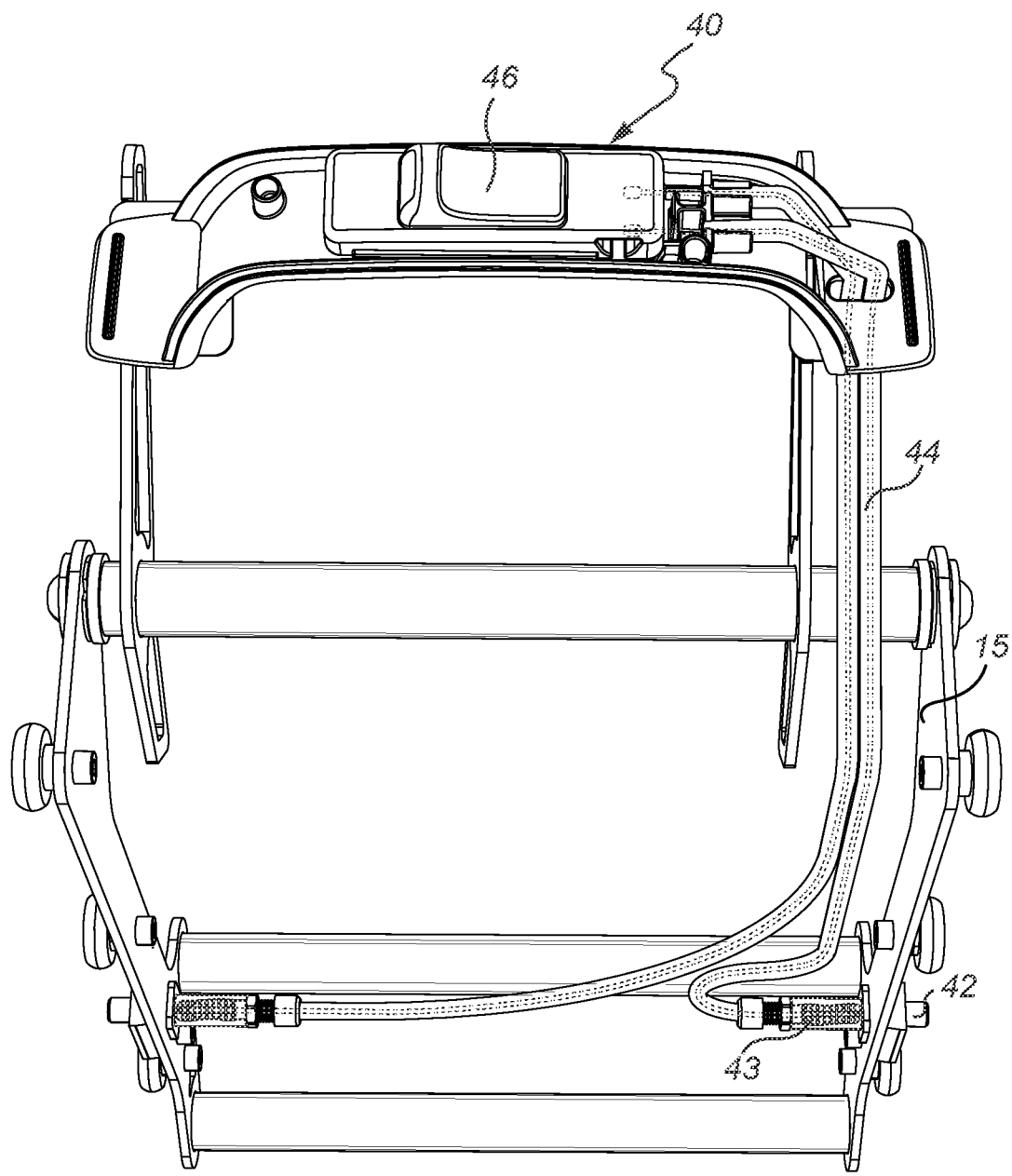
FIG. 4 illustrates a detailed view of a sledge and adjusting means according to at least one example embodiment of the inventive concept.

FIG. 4 illustrates, in a detailed view, the sledge 15 and adjusting means 40 comprising the actuator 46 arranged to release the sledge 15 from the pair of rails 100, as illustrated in FIGS. 2 and 3b, such that the sledge 15 is free to move along the rails 100 under influence of manual impact. A compression spring 43 is connected to the pin 42. The compression spring 43 is arranged to force the pin 42 into one of the set of receiving openings 101 such that the sledge is fixed to the rail 100. Moving the actuator 46 to its second state causes the wires 44 to pull the pins 42 against the force of the springs 43.

Figure 5A:
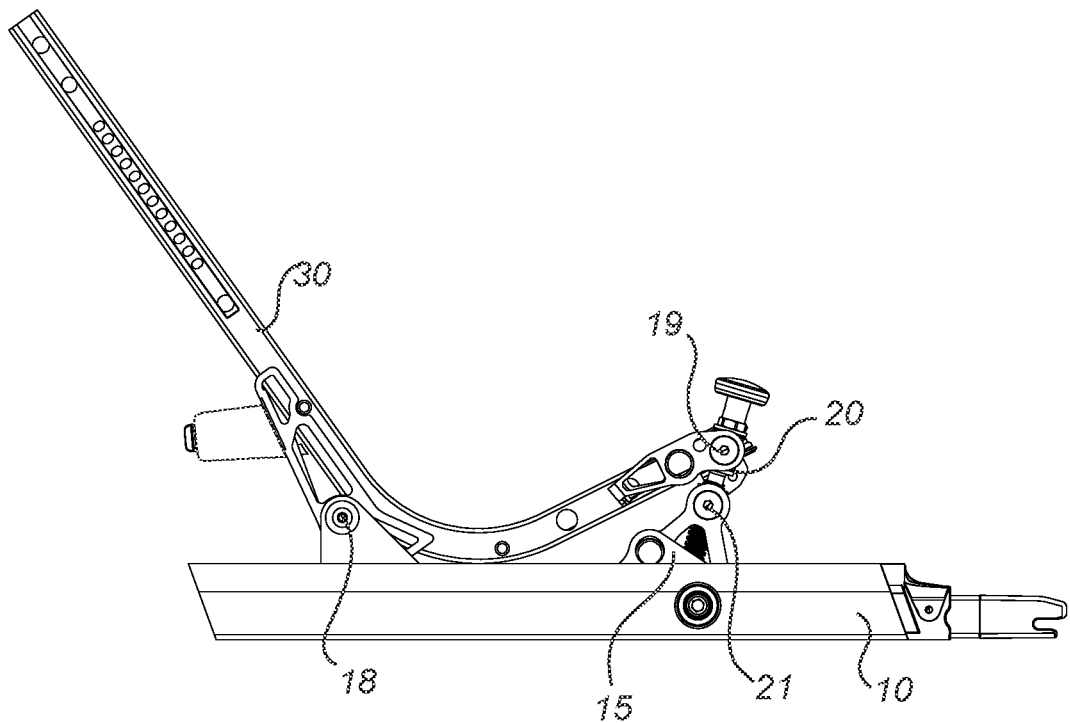
FIGS. 5a and 5b illustrates, in a side view, the tilting of a child safety seat according to at least one example embodiment of the inventive concept.
Figure 5B:
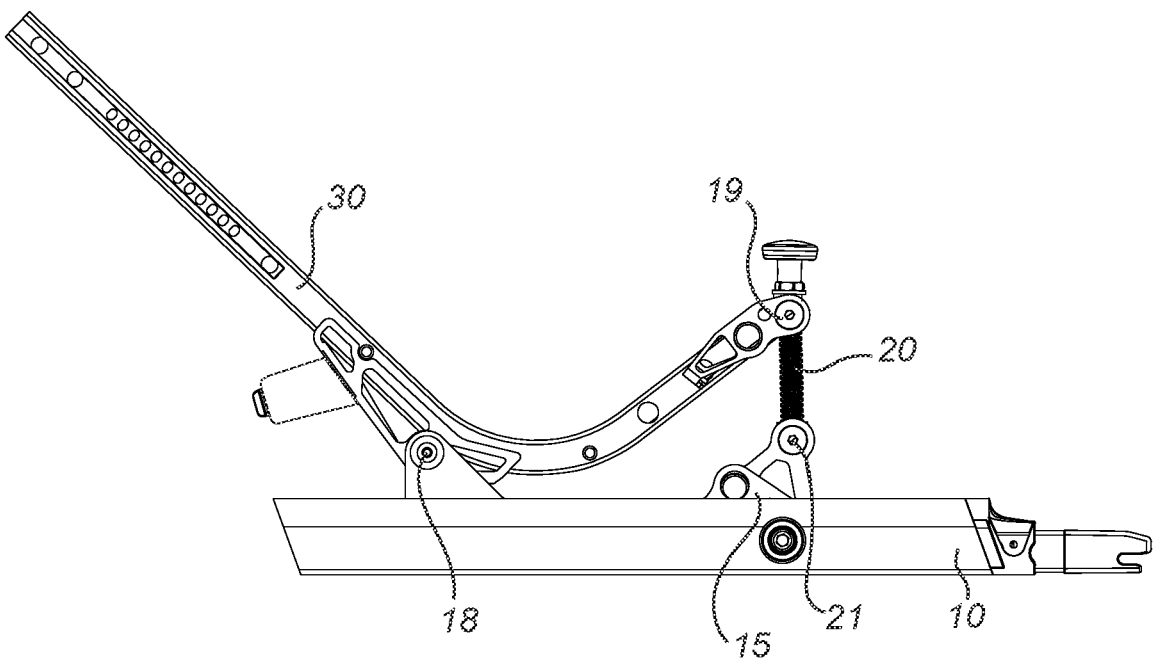

FIGS. 5a and 5b illustrate, in a side view, how to tilt the child safety seat 50 illustrated in FIG. 1. The child safety seat 50 (here, in FIGS. 5a and 5b, only the frame 30 of the child safety seat is illustrated for reasons of clarity) is pivotally connected to a sledge 15 at a first location 18. The child safety seat 50 is also connected to the sledge 15 at a second location 19 located behind the first location 18 when watching in the direction of travel. The second location 19 is like the first location 18 a pivotal connection point. The child safety seat 50 is connected to the sledge 15 via a screw 20. The screw 20 is pivotally connected to the sledge at a third location 21. By rotating the screw 20, the length of the screw between the sledge 15 and the child safety seat 50 is altered and consequently the child safety seat 50 is tilted forward or backward depending on the direction in which the screw 20 is rotated. The child safety seat 50 illustrated in FIG. 5a has an upright position and the length of the screw is short between the child safety seat 50 and the sledge 15. On the contrary, the child safety seat 50 illustrated in FIG. 5b has a tilted position and the length of the screw is long between the child safety seat 50 and the sledge 15.

The invention claimed is:

1. A child safety seat assembly for use in a rear facing position, comprising:
    a child safety seat, and
    a base portion, to be placed on a vehicle seat and for holding said child safety seat, wherein said base portion comprises
    at least one rail,
    a pair of ISOFIX latches, connected to said at least one rail and for connecting said base portion to the vehicle seat,
    a brace directly connected to said at least one rail and arranged to be pressed against a backrest of the vehicle seat, and
    a sledge connected to said at least one rail and for holding said child safety seat, wherein said sledge being, with said child safety seat mounted thereon, movable within said at least one rail such that the position of said child safety seat is adjustable parallel with the lengthwise extension of the rails when said child safety seat assembly is connected to the vehicle seat.

2. A child safety seat assembly according to claim 1, further comprising adjusting means, operatively connected to said sledge and arranged on said child safety seat, for adjusting the longitudinal position of said child safety seat along said at least one rail.

3. A child safety seat assembly according to claim 1, wherein said at least one rail comprises a set of receiving openings distributed in the longitudinal direction of the rail and said sledge comprises at least one pin adapted to connect to any opening of said set of receiving openings, such that the position of said sledge relative said base portion is secured by said pin.

4. A child safety seat assembly according to claim 3, wherein said pin comprise a compression spring, and wherein said compression spring provides a tension to said pin such that said pin is urged to connect to one of said set of receiving openings when said pin is substantially aligned with one of said set of receiving openings.

5. A child safety seat assembly according to claim 2, wherein said adjusting means comprise an actuator located on the back of said child safety seat, said actuator having a first state in which said sledge is prevented from sliding and a second state in which said child safety seat is movable along said base portion.

6. A child safety seat assembly according to claim 5, wherein said adjusting means comprises a handle for adjusting the position of said child safety seat and wherein said actuator is located in connection to said handle.

7. A child safety seat assembly according to claim 5, wherein said actuator is connected to at least one wire extending from said pin to said actuator, and wherein a repositioning of said actuator from said first state into said second state disconnects said pin from one of said set of receiving openings, such that the longitudinal position of said child safety seat relative said at least one rail is adjustable.

8. A child safety seat assembly according to claim 1, wherein said sledge comprises at least one wheel adapted to run within said at least one rail such that said sledge is able to run within said at least one rail.

9. A child safety seat assembly according to claim 1, wherein said child safety seat is pivotally connected to said sledge at a first location such that said child safety seat is adapted to be tilted with respect to said sledge at said first location.

10. A child safety seat assembly according to claim 9, further comprising a screw connecting said child safety seat to said sledge at a second location spaced apart from said first location, and wherein operation of said screw is such that its length between said child safety seat and said sledge is changed, said child safety seat is tilted against or away from the backrest of the vehicle seat.

11. A child safety seat assembly according to claim 1, further comprising a supporting leg connected to said at least one rail such that said brace, said supporting leg, and said ISOFIX latches provide four contacts points between said base portion and the vehicle.

12. A child safety seat assembly according to claim 1, wherein said child safety seat is fixed to the child safety assembly.

13. A child safety seat assembly according to claim 1, wherein said at least one rail comprises a pair of rails, wherein each one of said ISOFIX latches is connected to a respective rail.

\* \* \* \* \*